United States Patent [19]

McCallum

[11] 4,085,028
[45] Apr. 18, 1978

[54] ELECTROLYTIC CHLORINATION DEVICE

[75] Inventor: John McCallum, Worthington, Ohio

[73] Assignee: Electro-Chlor Corporation, Worthington, Ohio

[21] Appl. No.: 525,882

[22] Filed: Nov. 21, 1974

[51] Int. Cl.² .............................................. C02B 1/82
[52] U.S. Cl. .................................... 204/269; 210/149; 204/268; 210/169
[58] Field of Search .............. 204/268, 149, 228, 254, 204/255, 231, 267, 269; 210/169, 192

[56] References Cited

U.S. PATENT DOCUMENTS

| 1,905,295 | 4/1933 | Lima, Jr. .............................. 204/231 |
| 3,192,146 | 6/1965 | Vellas et al. ...................... 204/149 X |
| 3,242,059 | 3/1966 | Cottam et al. ........................ 204/98 |
| 3,485,729 | 12/1969 | Hertz .................................... 204/131 |
| 3,563,879 | 2/1971 | Richards et al. ................ 204/149 X |
| 3,769,196 | 10/1973 | Vikey ................................ 204/149 X |
| 3,774,246 | 11/1973 | Beer .................................. 204/149 X |
| 3,835,020 | 9/1974 | Galneder .............................. 204/268 |

OTHER PUBLICATIONS

Dept. of Commerce, "Manual of Patent Examining Procedure", pp. 59, 60, 63, 64 and 72.

Primary Examiner—Arthur C. Prescott

[57] ABSTRACT

Bipolar cells are designed to permit the introduction of full wave, half wave, or time proportioned, rectified and unfiltered current into a special electrolysis zone which contains coated titanium anodes and steel cathodes with nonconducting baffles which protrude beyond each bipolar electrode in water containing dilute salt solutions. Thereby voltage transformers are eliminated and amperages are very much decreased and easily controlled. For the chlorination of swimming pools, all of the filtered pool water is passed directly through the bipolar electrodes at velocities between 3 and 6 feet per second. This direct liquid flow combined with time proportioned electric current and with iron or stainless steel cathodes prevents the accumulation of precipitates in the cell and permits the control of a wide range of chlorine concentrations while prolonging the life of the coated anodes. Because there is substantially no voltage or current control, shielding strips are required to protect the edges of electrodes from electrochemical corrosion without impeding the flow of water. Also, grounded screens must be placed sufficiently far from the bipolar electrodes at both entrance and exit ends so that voltage gradients between facing positive and negative electrodes in each bipolar cell are substantially greater than voltage gradients between any electrode and the grounding screens. For normal operations and up to 50 percent of the emergency requirements of local health authorities, a half wave rectification is preferred. For emergency superchlorination, full wave rectification is employed. A novel structure for bipolar electrodes is described and used in large and small devices for making hypochlorite solutions.

10 Claims, 10 Drawing Figures

U.S. Patent  April 18, 1978  Sheet 1 of 3  4,085,028
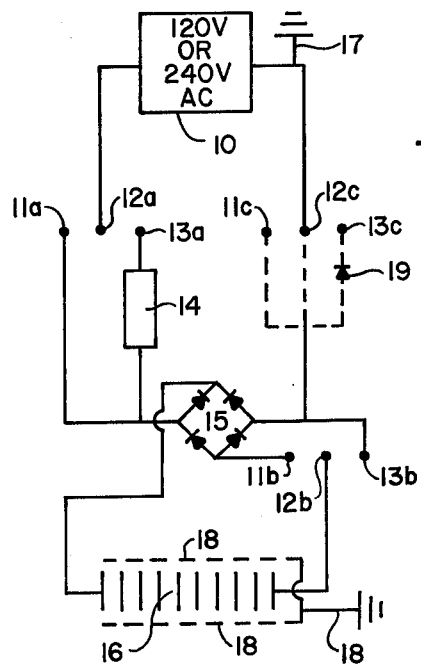
FIG. 1
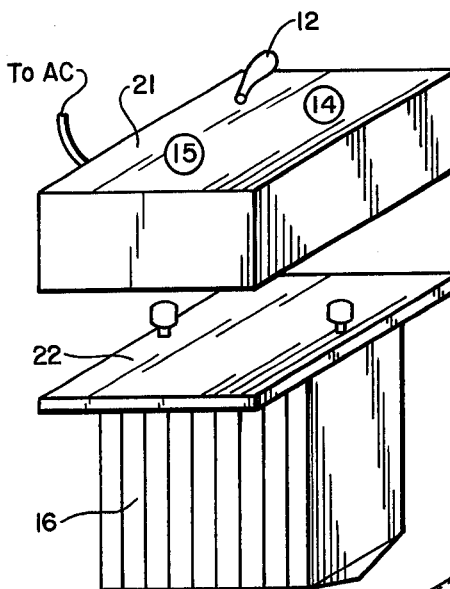
FIG. 2
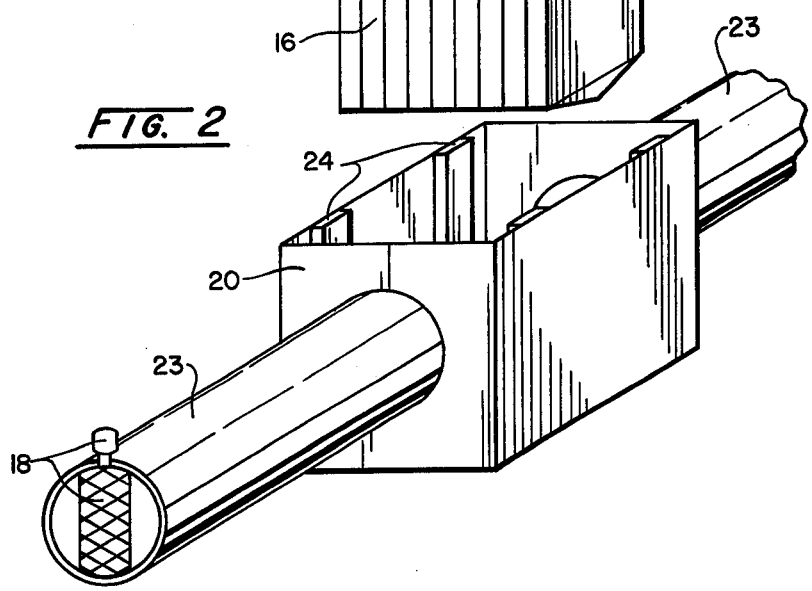

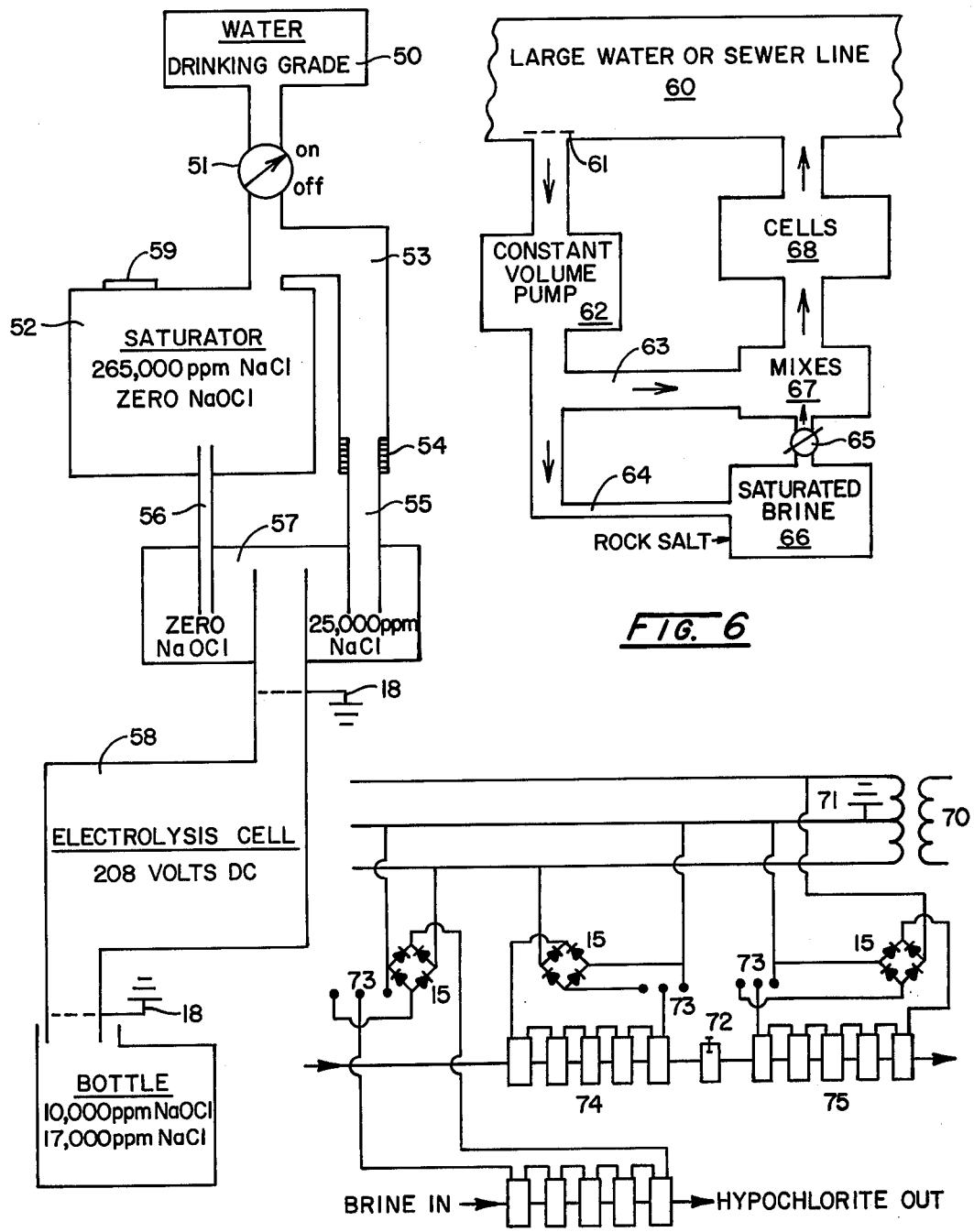

ELECTROLYTIC CHLORINATION DEVICE

NATURE OF THE INVENTION

This invention relates to the electrochemical preparation of hypochlorites or chlorine from dilute water solutions of chlorides using substantially uncontrolled line voltages and more particularily concerns an article of manufacture for the continuous chlorination of swimming pools and the making of hypochlorite solutions.

BACKGROUND OF THE INVENTION

Electrolytic chlorinators and other kinds of electrochemical cells for the purification of waters have long been known. Many of these cells electrolyze concentrated brines and proportion chlorine or hypochlorites into the water circulation system. One such device is the "Aerion" Salt Chlorine Converter manufactured by the Franklin-Parker Corporation of Palo Alto, California. Other devices are described in British Pat. No. 1,323,713 and U.S. Pat. No. 3,351,542 and older patents. Other cells are made to electrolyze dilute salt solutions but these have required stepdown and variable transformers with fluid bypasses and/or temperature sensors and sometimes with reversal of currents to remove accumulated precipitates. Such devices are described in U.S. Pat. Nos. 3,458,414, 3,481,857, 3,223,242, and others. A cylindrical cell operating at 20 volts is offered for sale by the K-Ionics Company in Chatworth, Calif. Still others, such as U.S. Pat. No. 3,192,146, have used silver electrodes to utilize what is called "oligodynamy." All of these known cells suffer from inconveniences to those who use them and are prohibitively more expensive than alternative methods for simply adding chlorine or hypochlorite solutions at rates usually demanded by health authorities. Presently available cells tend to be undersized because of their expense. All of them require transformers, rheostats, or other means of controlling the voltage and current. Consequently, pool owners, those who make pools and those who sell supplies to pool owners are keenly interested in obtaining practical and low cost devices for the in situ chlorination of swimming pool waters.

The need for such devices is attested to by the large number of past unsuccessful attempts to invent a practical device for swimming pools. Actual chlorine requirements vary over wide ranges from about 0.1 to 10 pounds of chlorine per million pounds of circulating water which turns over a complete pools' capacity in 6 to 12 hours. The exact requirements depend on local conditions, as interpreted by local health authorities. The technical difficulties to satisfy the maximum requirements with equipment that frequently faces only the minimum requirements have not heretofore been solved in a practical way. The present use of large currents at low voltages requires special wiring, with expensive transformers, switches, rectifiers and controls for temperature, voltages, and fluid flows. Small currents at higher voltages have not been practical because a number of cells are then required to be in electrical series while the water is then made to pass in parallel or series through the cells. A number of electrical and plumbing inefficiencies are encountered with the parallel flows of water. When attempts are made to decrease the volts per cell by placing electrodes close together, hard water impurities tend to precipitate quickly in some of the electrolysis zones thereby plugging the cells and stopping the electrical current and flow of water. If voltage decreases per cell are sought by increasing salt contents in the waters, too much salt becomes objectionable to the swimmers. On the other hand, too little salt leads to the requirement of very large electrodes at small current densities thereby making the cells prohibitively expensive to manufacture and to maintain in an operating condition. Also, no one has solved the electrical distribution problems encountered with the introduction of substantially full line 120 or 240 volts into bipolar electrolysis cells in proximity to metal equipment and swimmers in the same electrolyte.

In other attempts to meet the extreme demands for purification of pool waters by electrolysis of dilute solutions, cells have been designed with extensive paths for the prolonged electrolysis of the solutions passing through. U.S. Pat. No. 3,305,472 describes one such cell for use with bromide additions with an example which shows the same kind of electrolysis will not work with dilute chloride solutions. This approach of extensive electrolysis of bromide solutions led to the production of bromates and perbromates which are of no use for purifying swimming pools and, of course, the production of chlorates or perchlorates is also undesirable.

One of the problems encountered with the introduction of high voltages directly into a set of bipolar electrodes is the creation of voltage gradients between metallic parts or swimmers and certain of the electrodes, even if those metallic parts or swimmers are properly grounded. This existing grounding problem may be understood by reference to FIG. 1 wherein an ordinary alternating current and voltage source is shown at 10 with one side grounded at 17. The nature of commercial, 60 cycle, alternating current in the United States is such that the ungrounded, "hot," line alternates from a nominal 120 volts positive with respect to ground to a nominal 120 volts negative with respect to ground and with a wave form substantially like a sine wave wherein the root-mean-square, rms, ac voltage or current is only 0.706 times the peak voltage or current. Thus, the 120 rms volt source in FIG. 1 may have a peak voltage of about 170 volts ac. When this large peak voltage is fed into the bipolar cell 16, it means that grounded persons or metal parts are as much as 170 peak volts separated from that ungrounded lead. Whether a grounded person is 170 volts more positive or 170 volts more negative than this "hot" lead will generally make no difference if he feels a shock. However, when pool walls, pump parts, valves or any other metallic components are in contact with the same water which also contacts the "hot" electrode, the polarity with respect to ground can make much difference. Thus, when the "hot" electrode is positive with respect to ground, all other metal parts in the system are negative with respect to the "hot" electrode and will merely tend towards evolution of hydrogen gas and with no harm to that part. When the "hot" electrode is negative with respect to ground, however, all grounded metal parts in the system are positive with respect to the "hot" electrode and tend to be electrochemically oxidized or corroded. Even a very small amount of such corrosion over a continuous period of time could lead to catastrophic damage of metal parts in the pool system. This grounding problem is numerically the same when the primary power source is a nominal 240 volt ac line, for then a third wire may be grounded but the two "hot" lines each alternate oppositely by 120 rms volts positive and negative with respect to ground. Thus, at 240 rms volts, no electrode is more than 120 rms volts from ground, just as desribed above for a 120 rms volt system. With center-tapped isolation transformers, between the power source 10 and rectifier 15, the grounding problem can be cut in half for the 120 rms power source, but even this partial aid is inadequate for safe grounding and will raise the cost of the device and its circuitry to price levels which tend to make the device impractical for the owners of swimming pools.

As a result of these fundamental problems, chlorine or bromine chemicals are generally added directly, either as concentrated solutions or as slowly dissolving sticks or pellets. These halogen concentrates are expensive, corrosive, poisonous, and require a substantial amount of experience and expertise to use properly. Some pool owners find the presently available chlorination methods so complicated (there is too much or too little chlorine) that they dump in large excesses of chlorine chemicals during the night counting on sunlight to "burn off" the excess during early morning hours. This is a dangerous and inefficient use of chlorine. Electrochemical devices on the market are not flexible enough to satisfy the extreme requirements of local health authorities and, therefore, require a combination of electrolysis with chemical additions.

OBJECTS

An object of this invention is to provide a convenient device that unskilled persons can use to maintain appropriate chlorine levels in private or public swimming pools. Another object is to provide a simple electrolysis device that is both safe and practical enough that all swimming pool operators, both large and small, will find it advantageous to use the device for keeping their pools in a sanitary and attractive condition at all times. Another object is to provide a controllable electrolysis cell that will operate off commercially available power lines without the use of intermediate transformers or voltage regulators. Yet another object is to provide practical electrolysis devices for making household bleaches and other oxyhalide solutions.

SUMMARY OF INVENTION

In this disclosure, the term "bipolar electrode" means any electrode structure which acts as both anode and cathode during electrolysis and to which there are no direct electronic connections with the external power source. FIG. 2 shows how the bipolar electrode assembly 16 is inserted into permanent electrolysis cell 20 which is fitted directly into the exit line of the pool filter. A permanent control box 21 is placed on cover 22 of the electrode assembly and includes a rectifier 15, a time proportioning regulator 14, a 2-pole, double throw, on-off-on-switch labeled 11, 12, 13 in FIG. 1 and 12 in FIG. 2. These three elements 20, 21, and 22, are fastened together during operation. One feature of this invention is that these three elements can be separated easily as illustrated in FIG. 2 for simple replacement or examination of electrode assemblies 16. Another feature of this invention is the wide range of control for chlorine production. Thus, for normal operation up to one-half the maximum required by health authorities, half-wave rectification is applied to the bipolar electrodes with the grounding screens and negative electrodes both fully grounded. More exact chlorine concentrations are adjusted simply by means of the time proportioning regulator 14. For emergency operations, full wave rectification is used with the same grounding screens and without time proportioning of the input power supply. Another important feature of this part of the invention is that liquids can be moved directly and uniformly through all bipolar cells at velocities between 3 and 6 feet per second merely by providing electrode assembly 16 with a combination of $n$, the number of positive or negative electrodes, and Gap width, the identical distances between all electrode faces, and H, the exposed electrode height, such that $(n \times \text{Gap} \times H)/(\text{Gal/minutes})$ is greater than 0.0535 but less than 0.107. A ratio value of 0.0642 is preferred for cell design purposes.

Yet another feature is that edges of all electrodes are protected by shielding strips or by recessed slotting for electrodes. Also, it has been found desirable to have the grounding screens placed approximately $10n$ times the distance between opposite electrode faces. These grounding screens must be inert to anodization on both sides as well as porous.

The use of baffle extensions between bipolar electrodes is mandatory and a part of this invention is the finding that their extensions beyond electrode edges should be at least 10 times the distance between opposite electrode faces and preferably 10 times the distance between extreme positive and negative electrodes.

The methods for making and sealing connections between bipolar electrodes is novel and very useful.

Finally, it has been discovered that the combination of (a) steel cathodes with (b) fluid velocities in excess of 3 feet per second and with (c) time-proportioning electrical current pulses is uniquely suited to avoiding the accumulation of hard-water deposits on the cathode surfaces.

Unique combinations of these features are claimed for a variety of devices to make sodium hypochlorite of preselected concentrations at preselected rates.

BRIEF DESCRIPTION OF DRAWINGS

FIG. 1 is a schematic diagram of the preferred electrical circuits.

FIG. 2 is an exploded view of the entire device.

FIG. 5 is a system for making and dispensing sodium hydrochlorite solutions.

FIG. 6 is a system for chlorinating large water or sewer lines.

FIG. 7 is the electrical system required to achieve close and convenient control of the hypochlorite system of FIG. 6.

DESCRIPTION OF PREFERRED EMBODIMENTS

Turning now to a specific embodiment of this invention in FIG. 2, the electrolysis cell 20 is made with standard male or female plumbing fixtures 23 for insertion directly into the filter line after filtering but before entry into the pool. It is essential that this cell 20 and all attached fittings which are in contact with the water be made of a suitable nonconductor, such as plastic or hard rubber. On each side, or where convenient inside cell 20, are placed spacers 24. These spacers are made of the same material and as an integral part of cell 20. These spacers restrain said electrode assembly from being shifted by movements of pool waters through the device. The main points about spacers are to retain uniform flow of the water and to keep the electrode assembly 16 in its proper position.

Figure 3:
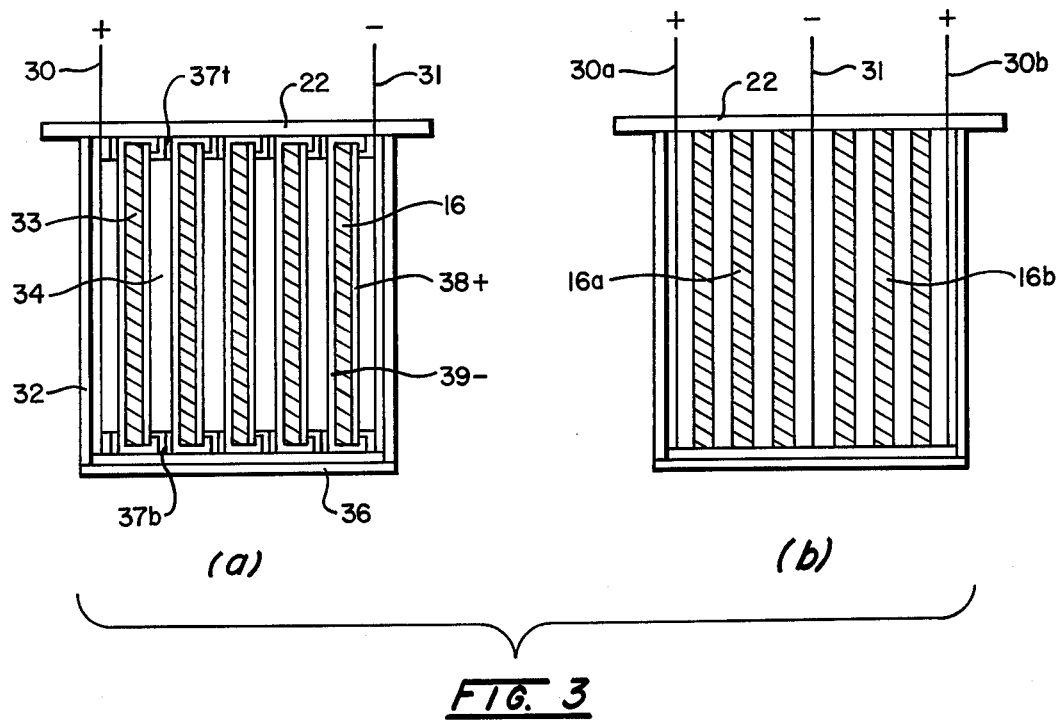
FIG. 3(a) is a front view of removable cover 22 with attached electrode assembly 16 and other attached parts.
FIG. 3(b) is a front view of two bipolar electrode assemblies 16a and 16b attached to the same removable cover 22.
Figure 4:
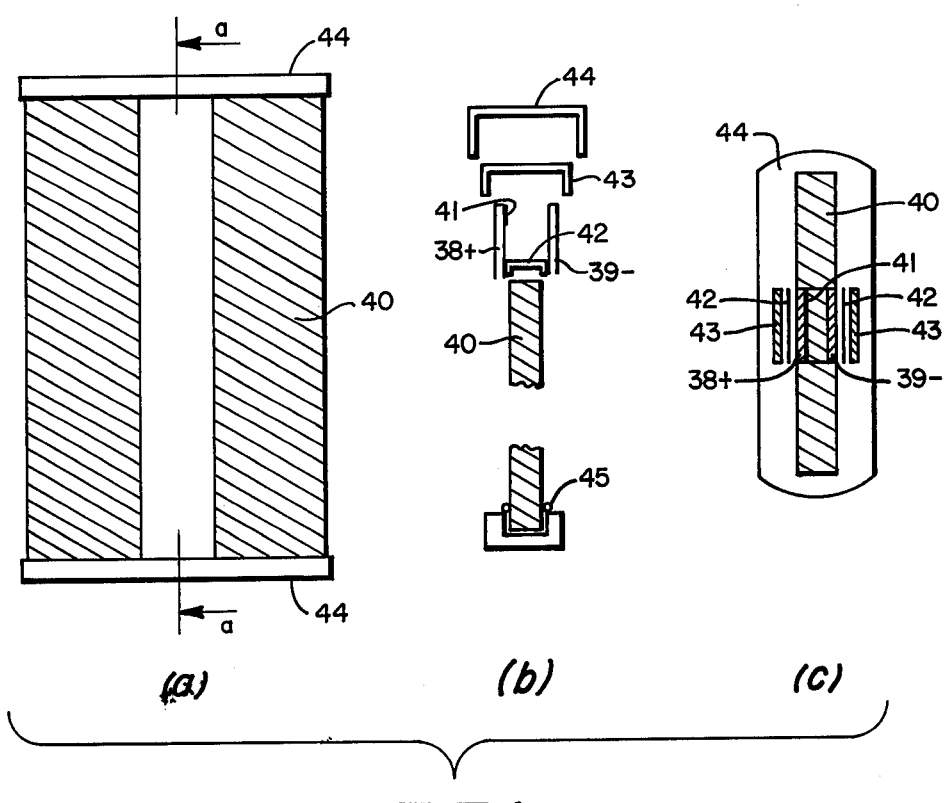
FIG. 4(a) is a front view of an individual bipolar electrode structure.
FIG. 4(b) is a cross-sectional view of an individual bipolar electrode structure at a—a in FIG. 4(a).
FIG. 4(c) is a top phantom view of an individual bipolar electrode structure.

To more fully appreciate some of the novel aspects of the electrode assembly 16 of this invention, as will be disclosed in connection with FIGS. 3 and 4, reference is made first to the power supplies already mentioned in connection with FIGS. 1 and 2. There, the time proportioning regulator 14 is one of the common silicon controlled devices which can change the duration of the alternating voltages fed to it but without any substantial change in those voltages or currents as they come out of the device. Several types of such controls are commercially available and the phase angle firing type is preferred for use with the electrolysis cell of this invention. The preferred type of regulator 14 is based on the triggered gating of a silicon rectifier at different phases of each cycle. With this phase angle firing type, a portion of each ac input wave is phased out and the remaining portion of each wave is used. Ordinary ac meters will indicate a lowered rms voltage and current when, in fact, the actual voltages and currents are not much changed but the "on time" has been changed to indicate the lowered rms meter readings. One such regulator 14 is the light-dimmer switch which is widely used with incandescent lighting systems and gives a modified ac output. A second type of regulator 14 is based on the zero voltage switching of a silicon rectifier by way of a self-contained time-based circuit so that the entire output waveform is unchanged but only portions of the total numbers of cycles are used. Then again, with this time proportioning, an ordinary rms ac meter will indicate lowered voltages and current when, in fact, the on-voltages are unchanged but the on-times are decreased to give the lowered rms voltage or current reading. Another such regulator 14 is the infinite range switch used in electric stoves which also gives a modified ac output based on a thermal switching mechanism. These thermal switches normally operate with on- and off-times measured in seconds so meters usually just read zero or rms values. Yet another regulator 14 is the device sold for the speed control of dc or ac/dc motors which gives an unfiltered, intermittant dc output. Such motor regulators give full wave rectification and, therefore, can defeat the preferred switching arrangement depicted in FIG. 1. All such regulators are small, low in cost, reliable, and capable of handling relatively large currents without getting hot. They differ from the transformers or rheostats heretofore used for electrolysis cells in that the transformers and rheostats essentially control the output voltages of a continuous power supply whereas the regulator 14 of this invention will provide intermittent power with peak voltages not far removed from peak voltages made available to it. Moreover, part of the discovery of this invention is that these devices, on half-wave operation, can exceed their on-time rates current and wattage capacities thereby leading to a long-lived and trouble-free electrical control for these electrolysis cells. By using these modern regulators in this invention, and without further control of currents or voltages, smaller sizes, lower weights, lower costs, increased efficiencies in the use of electrical power, and more trouble-free and convenient control can be achieved but, at the same time, the electrode assembly must then be made to cope with the very high voltages with respect to ground, up to 170 volts peak on nominal 120 or 240 volt rms supplies, which will be encountered in the electrolysis zone.

The full wave bridge rectifier 15, in FIG. 1 is used without chokes or electrical filters to change the raw rectifier wave shape. Thereby, the simplicity, the reliability, and the safety of the electrical control box is increased while the physical sizes and the costs are decreased. More exactly, the circuit in FIG. 1 is handled as follows for these various operating situations.

1. For 120 volts rms ac, grounded line 17 must be connected to the negative terminal of the electrode assembly 16. Neither diode 19 nor switch 11c, 12c, and 13c are in the circuit. Then, for full wave emergency chlorinations, switches 12a and 12b are connected to terminals 11a and 11b respectively. It is essential that positions 12a and 12b are not shorted to one another, inasmuch as some commercial on-off-on double pole switches have a common off-connection. Such common off-connections cannot be used with this invention. For half-wave normal operations, switch positions 12a and 12b are connected to terminals 13a and 13b respectively. Then fine adjustments of chlorine concentrations are made with the time proportioning regulator 14. Grounding screens 18 are always grounded separately via the third wire associated with the energy source. Regulator 14 should be on the "hot" line side of bipolar cell 16, otherwise the internal circuitry of control 14 tends to interfere with the grounding circuit.

2. For a 240 volt rms energy source, neither ground 17 nor switch 11b, 12b, and 13b are in the circuit. Then, for full wave emergency chlorination rates, switches 12a and 12c are connected to terminals 11a and 11c, respectively. For half-wave normal operations, switch positions 12a and 12c are connected to terminals 13a and 13c, respectively. For this 240 volt power source 10, control 14, and rectifier 15 can be in either "hot" line provided diode 19 is on that side of cell 16 which prevents application of positive potentials to the negative side of cell 16.

With these combinations of simple circuits, several practical problems are solved with the use of simple, low-cost, and readily available parts: (a) shorting of ground 17 to the most negative electrode in cell 16 by way of switch 13b for a 120 volt power source 10 improves the electrochemical efficiency because the electrochemical path to the grounded power line then has less resistance than to the more remotely located grounding screens 18: (b) inserting of diode 19 for a 240 volt power source in switch position 13c blocks the application of positive voltages to the negative electrodes in cell 16 with respect to the grounding screens 18: (c) diode 19 for a 240 volt power source assures that other grounded parts of the entire swimming pool system are negative or neutral, and never positive, with respect to electrodes in cell 16 during half-wave rectification, thereby helping to eliminate any corrosive damage to metal parts anywhere in the system; (d) with half-wave rectification, average current densities are halved and chloride concentrations at each electrode face are effectively doubled, thereby increasing the life of the expensive coated, titanium anodes; (e) the placing of regulator 14, and rectifier 15 on the "hot" side of a 120 volt power source permits control of chlorine concentrations by way of regulator 14 whereas insertion of either regulator 14 or rectifier 15 into the grounded side tends to cause current to go directly to the grounding screen 18, thereby bypassing regulator 14 and causing nonuniform current densities among the various bipolar cells 16; (f) the placing of switch position 13b on the opposite side of the power source 10 from switch position 13a permits the short between grounds, already mentioned for a 120 volt power source and for a 240 volt power source, to minimize parasitic currents to ground 18; (g) the direct connection of grounding screens 18 separately from ground 17 or other parts of the circuit minimizes any possibility of shocks to swimmers in the pool; and (h) because the grounding screens are positive with respect to negative electrodes during full wave operation there is a small reversal of current which helps to keep the grounding screen clean of deposits during full wave operations which may have cathodically accumulated during half-wave operations.

Because the grounding screens 18 can be positive with respect to negative electrodes in the full-wave mode, it is essential that grounding screens be made of inert materials, such as commercially available coated titanium electrodes for chlorine production with coatings on both sides of the screens.

Full voltages from rectifier 15, in FIGS. 1 and 2 are applied directly to the extreme positive electrode 30, and extreme negative electrode 31, in FIG. 3a. For full wave rectification, neither electrodes 30 or 31 can be grounded because both electrodes 30 and 31 alternate between ground and 120 rms volts positive and negative, respectively. However, electrode 31 is always negative with respect to any potentials around it and hence, negative electrode 31 can be made of any metal which is stable in dilute halide solutions which are mildly alkaline, that is, at pH values greater than 7.0. Iron, stainless steel, and uncoated titanium have been used for the extreme most negative electrode but stainless steel is preferred because cathodic deposits do not adhere to it and because it is a relatively stable material in these solutions when current is not flowing. Cathodic deposits have been found to accumulate and adhere to titanium cathodes in spite of the rapid liquid flow and half wave operations. Cathodic deposits have been found not to adhere to common iron or steels but these tend to rust during off times.

Electrode 30 is always the most positive electrode in the system and, hence, positive electrode 30 must be made of material that will withstand the most severe electrolysis conditions. Commercially available coated titanium electrodes have been found suitable for the extreme positive electrode 30 providing their entrance and exit edges are coated or otherwise protected from corrosion by pitting. A combined protection of the edges is preferred wherein the edges are coated with the same material as on the electrolysis surface plus the electrode is recessed slightly into holder 32 by way of slotting into 32 or by way of adding plastic strips to holder 32.

The bipolar electrodes 33, between electrodes 30 and 31, have alternate positive 38 and negative 39 faces with respect to electrodes opposite them across the gaps 34. Consequently, every positive face 38 of the bipolar electrodes 33 is made of the same material as the extreme positive electrode 30. The negative face 39 of the bipolar electrodes 33 can be made of the same material as the extreme negative electrode 31. However, while the negative face of the first bipolar electrode next to extreme positive electrode 30, is always negative with respect to electrode 30, it is, at the same time, positive with respect to the ground screens or to other grounded metal parts in the circulation system. This potential relationship to negative faces of bipolar electrodes decreases from bipolar electrode to bipolar electrode as one proceeds across the electrode assembly from extreme positive 30 to the last negative side of the bipolar electrode before the extreme negative 31. Consequently, deterioration by corrosion of the negative electrodes tend to occur most rapidly on the first negative face opposite the most positive bipolar electrodes. Corrosion tendencies decrease in going across the bipolar electrodes toward electrode 31, as just explained above for the voltages.

In the actual design of the cells of this invention, it has not been obvious what is the best way to build devices for small pools and large pools and various sizes of pools with only two nominal voltage sources, i.e., 120 and 240 rms volts, while maintaining electrode dimensions relatively symmetrical to the inlet plumbing and without significant changes in fluid velocities, or without demanding unreasonable values for small gaps, large electrodes, or high salt concentrations and, at the same time, keeping all parts outside the cell properly isolated with respect to ground potentials and meeting a wide range of health requirements. Part of this invention, therefore, is the disclosure that electrode and cell dimensions may be calculated with the use of three equations:

1. an equation for liquid flows, $n \times \text{Gap} \times H = 0.0642 \times (\text{gal/min})$
2. an equation for voltage distributions, Av. dc volts $= 2.1 \times n + n \times \text{Gap} \times R \times \text{Av. Max. } \overline{CD}$
3. an equation for electrical current, Av. dc amperes $= 0.173 \times (\text{gal/min}) \times \text{ppm chlorine}/n$ In these Equations, $n$ is the number of bipolar cells across which an average dc voltage is applied to give an average maximum current density, $\overline{CD}$, in amperes per square inch through an electrolyte whose electrical resistivity is $R$ ohm-inch. $H$ is the exposed height of the bipolar anodes in inches.

Equation (1) is based on a nominal flow rate past the electrodes of about 5 feet per second. Although the numerical value in Equation (1) may vary between 0.0384 for 3 feet per second and 0.0768 for 5 feet per second, below 3 feet per second, hard water precipitates tend to accumulate on some parts of the cathodes. Some plumbing codes limit liquid velocities in pool systems to no more than 6 feet per second. The gal/min is based on turnover rates required by local health authorities. Gap is the distance in inches between opposite positive and negative electrode faces in each bipolar cell or between the two electrodes of a monopolar cell when $n = 1$.

The Av. dc volts in Equation (2) are substantially equal to the mathematical ratio of an average to a rms voltage for sine wave, i.e., Av dc volts = rms volts × 0.637/0.707, minus a voltage loss in the rectifiers at full load. Thus, for 120 rms volts into a full wave rectifier bridge, the average dc no load voltage is about 108 volts and the full load output dc average voltage for commercial 3 to 30 ampere rectifier bridges is about 104 volts. Similarily, the average full load dc volts for a 240 rms ac power source is about 208 volts. A value of 80 ohm-inch is used for 0.25 weight percent sodium chloride at about 75° F and the maximum average current density is 1.5 amperes per square inch of each positive electrode. With half wave rectification, the on-voltages are the same as just described for full wave rectification but a dc meter will give values about one-half as large, i.e., about 54 volts at no load and about 52 volts at full load.

The equations themselves are surprisingly simple and useful because gaseous overvoltages and concentration polarizations would be expected to bring about a nonlinear equation different from that found to be more typical of what actually happens in these bipolar cells. A resistivity of 80 ohm-inch is surprisingly small because well known handbook values for dilute sodium chloride are at least 50 percent larger. A maximum average current density of 1.5 amperes per square inch is surprisingly large because the dilute sodium chloride concentrations would normally support less than one-half this current density. Any magnitude of current density could be achieved by mere decomposition of water into hydrogen plus oxygen, if enough voltage is applied. The surprising result here is that high current efficiencies for hypochlorite production can be achieved with these cells when salt concentrations are as small as 0.25 weight percent. Even smaller concentrations of sodium chloride can be used except for the extreme instances when superchlorination may be required. Equation (3) is based on Faraday's Law of Electrolysis wherein (gal/min) is the rate of flow through the device and ppm is set at the maximum desired chlorine content to calculate the maximum average dc amperes during design considerations for specific pool requirements.

In addition to the obvious changes available for design in, $n$, Gap, H, R, $\overline{CD}$, outside and inside cell dimensions, and pool requirements, notice that Av. dc volts is not a variable and that Av. $\overline{CD}$ is varied by changing "on time" as previously explained for regulator 14. Notice, also, the nonobvious possibility to put two or more sets of bipolar electrodes in parallel thereby increasing $n \times$ Gap for a given height of electrodes and permitting allied adjustments to be made in the other variables. This embodiment of parallel sets of bipolar electrodes is indicated in FIG. 3(b) where extreme negative electrode 31 is in the center and extreme positive electrodes 30a and 30b are at the sides. For this arrangement, regulator 14 is placed in the ungrounded line to 30a and 30b before the separation into parallel paths.

For 240 rms volt systems, the negative electrodes 31 are not grounded because the main power lines are then connected directly to electrodes 30 and 31, or to 31 and 30a and 30b. Regulator 14, then rated for use in 240 volt systems, is placed in either the line to 31, or before splitting into 30a and 30b. For either 240 volt operation in FIG. 3(a) or for two 120 volt parallel sets in FIG. 3(b), a value of 208 is then used for Av. dc volts in Equation (2) and $n$ is the total number of bipolar cells in the complete device.

The usefulness of Equation (2) is not limited to the design of electrodes but has also been found to help define grounding limitations and other electrical leakage paths associated with the baffles and other parts of an entire pool system. Thus, during on-times, voltages not only exist between adjacent bipolar electrode faces but voltage also exists between adjacent bipolar cells and between all electrodes and the grounding screens. The problem with leakage between bipolar cells is minimized with baffle extensions. A practical solution to the grounding problems was learned by experience to involve two factors: (1) the geometry of the cell design and (2) half-wave versus full-wave rectification.

For the geometric factor, the $n$ in Equation (2) has a numerical value of 1.0 for current density to or from each grounding screen whereas between the bipolar electrodes $n$ has the numerical value of the number of bipolar cells. Consequently, it is desirable to place the grounding screens more than $10n$ times the distance between electrodes away from the extreme positive and negative electrodes. To illustrate, when $n = 9$ and the $\overline{CD}_1$ between bipolar electrodes faces is made equal to 10 times the $\overline{CD}_2$ between the most positive electrode and the grounding screen then, from Equation (2)

$$Gap_2 = 9 \times 10 \times Gap_1[(104 - 2.1)/(104 - 21)] = 111 \times Gap_1$$

and it follows that electrodes with 125 mil gaps should be at least 13.8 inches away from the grounding screens in this hypothetical case involving a total of 20% parasitic currents to and from both entrance and exit grounding screens.

One of the major features of this invention is the discovery of how to make efficient and stable bipolar electrodes in the presence of high voltages in a relatively small volume of rapidly moving electrolyte. The theory and practice for using bipolar electrodes is well known to electrochemists. The principal criterion for successful operation of bipolar electrodes is to make electrical current flow through them rather than around them. Usually, this control of current is accomplished by having compartmented cells between the bipolar electrodes wherein there is no, or only a very small, liquid continuity between the cells, as in uncovered cells, for example, which have protrusions which extend up and beyound liquid levels. However, in the case of fitting directly into a closed swimming pool filter line, there is necessarily intimate liquid continuity between all bipolar electrodes and cells and this continuity tends to short out the bipolar action. Thus, when single pieces of metal are used as the bipolar electrodes in assembly 16, of FIG. 2, very large currents are observed to pass through the assembly but only a small amount of chlorine or hydrogen is produced. This poor efficiency is observed because, under these undesirable circumstances, the electrical current is essentially going around the bipolar electrodes rather than through them. On the other hand, bipolar electrodes prepared as disclosed in the invention can yield in excess of 90 percent current efficiency. The high efficiencies are obtained by placing baffles 40, in FIGS. 4(a), (b), or (c), between the positive and negative faces, of each bipolar electrode. The ends of baffles 40 must extend each way far enough that the current density between electrodes is more than 10 times greater than the current densities around both ends of the electrodes, as calculated with Equation (2). Thus, for example, if the $\overline{CD}_2$ around one end of the electrodes is desired to be only 5% of $\overline{CD}_1$ between electrodes, Equation (2) lets the designer calculate the distance out around baffles and back to adjacent electrodes, Gap 2, relative to the distance between electrodes, Gap 1. Then, $0.05 \overline{CD}_1 Gap_2 = \overline{CD}_1 Gap_1$, and the $Gap_2$, which is the distance around the baffles, should be equal to or greater than 20 times the distance between adjacent electrodes. Current leakage around baffles of nonadjacent electrodes involves the number of bipolar cells, as already explained in connection with the grounding screens, namely $Gap_2 = Gap_1[n(104 - 2)/(0.05)(104 - 21)]$ or $Gap_2 = 216 Gap_1$ when $n = 9$ cells and when a current leakage less than 5% between each side of the extreme electrodes is desired.

The baffles 40 must be made of rigid, nonconducting materials, such as acrylic sheets or rigid PVC. Leakage currents past these baffles are cumulative and tend to overload the positive electrodes, particularily at the edges. Consequently, it was found necessary to put strips on the baffles. Such strips are made to be approximately equal in thickness to the thickness of the electrode materials. Alternatively the electrodes can be recessed into the baffles to give the same effect as strips. The main function of strips or recessing is to help electrically shield coated or uncoated edges of both positive and negative faces 38 and 39 from unwanted edge corrosion. The strips or recessing also prevent water from going behind the electrodes, where lint or other small particles getting past the filter might tend to lodge. This recessing or use of strips, has been found to be very successful for increasing electrochemical efficiency and the life of electrodes by decreasing current losses out past the baffles 40, and by concentrating electrical fields to their opposite electrodes. They substantially decrease the effective areas for leakage currents. Then, even though the current density effects previously described remain valid, the actual leakage currents are made small compared with actual currents between adjacent electrode faces.

Another feature to be kept in mind when designing these cells is that fluid flow velocities are to be made uniform between all bipolar electrodes. Naturally, there is a tendency for maximum velocities at the center gaps with smaller velocities past the outside electrodes. This fluid flow situation is contrary to the situation desired to help support the extra leakage currents at the extreme positive and negative electrodes. Therefore, it is desirable to increase the length of center and intermediate baffles by an amount about equal to their displacement from the outside. This arrangement of baffles provides shorter paths at the outer electrodes which compensates for their displacement from the center line of fluid flow. However, it has been found that the same size baffles can be used for all bipolar electrodes in each cell providing extra cross-sectional area is provided both in front and in back of the electrode assembly and providing the device is not used continuously in the superchlorination condition.

Another novelty of this invention regarding the use of efficient bipolar electrodes in the stream of rapidly moving electrolyte, is the electrical connection of positive and negative faces inside the electrolysis cell 20. The most obvious way to connect the positive and negative electrodes on each side of each baffle is to utilize protruding tabs as is done for each end electrode 30 and 31. However, in practice, it has been found virtually impossible to accomplish so many closely spaced, external connections without having serious liquid leaks at some of the protruding terminals or serious electrical leakage around the inside top and bottom of each bipolar electrode. Moreover, such external connecting tabs to the coated titanium electrodes add at least 0.5 inch to the cut heights and this extra height adds 15 to 60 percent to the cost of the most costly material in the entire device. Instead, of external connections to all electrodes it has been found desirable to construct inside sealed bipolar connections as illustrated in FIG. 4. Positive electrode faces 38 are made with a height equal to the height of baffles 40. Negative electrode faces 39 are made about the same width but are made tall enough to reach over both the top and bottom of each baffle plus about 0.1 inch over the top and bottom of the positive electrode face for electrical contact. It is important that this contact be of very low electronic resistance while being completely isolated from the water flowing past it. This leakproofness combined with a maximum area of electrical contact is not easy to accomplish. Corresponding slots 37t and 37b in FIG. 3 were first attempted but liquid leakage into some parts of some of the joints inevitably led to rapid corrosion of the steel contacts. With the loss of contacts to just one bipolar electrode, the entire electrode assembly is made inoperable. Attempts to seal the joints after assemby of the bipolar electrodes were seldom successful. Instead, it was found necessary to put the electrode parts together and to seal the-bipolar electrodes separately and before the parts were assembled into a structure like 16 in FIG. 2.

The preferred way to make reliable bipolar electrodes is illustrated in FIG. 4, which is not to scale. For each family of devices, e.g., home pools or commercial pools, baffles 40 are all of the same thickness and width in the direction of water flow. The height of baffles is varied for different design chlorination capacities. Similarily, each positive and negative electrode has the same width and thickness for all pool sizes. Heights of positive electrodes 38 are also made exactly equal to the height of their baffles 40. Each baffle is routed to a depth and width on each side equal to the thickness and width of the positive and negative electrodes respectively. Thereby, the electrode edges are electrically shielded, as previously explained. The upper and lower back edges of the coated titanium positives are filed free of oxides, preferably preferable under a copper sulfate solution so that a thin immersion coating 41 of copper is placed on those parts of the back side. In the routed plastic slots, a thin inner conducting clip 42 of soft copper or aluminum foil is placed over each end. This inner conducting clip needs to be only 2 or 3 mils thick so that it is made to fit snugly over the ends of the baffles by simple pressing with fingers or machine and without appreciable change of overall electrode thickness. Next, the preformed positive 38 and negative 39 are placed in the slots against the thin, inner conducting clip 42. Over these parts are then placed the outer conducting clips 43 at top and bottom. These outer conducting clips 43 are about 15 mils thick and are made of hardened copper or stainless steel so as to provide a spring action towards the center. These outer conducting clips are bent into a U-shape with slightly more than 90° on each outside bend so as to give a spring force holding the parts in intimate contact. These inner and outer clips extend over the positive and negatives about 0.1 inch beyond the baffle height. Next, over each end are placed sealing caps 44 which are preformed out of plastic to fit snugly over the entire electrode assembly. The thickness of the sealing caps at the electrode faces are made exactly one-half of the thickness needed to assure the attainment of a parallel gap separation preselected in connection with equations (1) and (2) when the set of bipolar electrodes are assembled. All these parts can have cements or adhesives applied to them as part of the assembly procedure to help hold all parts together but these adhesives are not essential. It is essential, finally, to apply a sealant 45 around the periphery where sealing caps 44 just cover the outer conducting clips 43 and where the outer conducting clips 43 meet electrodes 38 and 39. It is imperative that this joint 45 shall permanently insulate parts 41, 42, and 43 from contact with the pool waters.

Extreme electrodes 30, and 31 or 30a and 30b are made to extend through cover 22 to provide direct contacts with the external power sources. The bipolar electrodes, preassembled as just described, are then inserted between the extreme electrodes 30 and 31 in the presence of a soft sealant against the cover 22 and bottom plate 36 to provide the final electrode assembly 16.

For the operation of this invention, it is desirable to maintain the concentration of common salt in the pool waters at about 0.3 weight percent, that is about 3000 ppm of sodium chloride. Other inventors have recommended concentrations above 4000 ppm. With the present invention 4000 ppm of salt are more than that necessary for the most extreme operations. About 2500 to 3500 ppm is the most desirable concentration range but concentrations down to 2000 ppm are generally adequate except for the emergency chlorination conditions. The preferred concentration of salt, of about 3000 ppm, is below the taste levels possessed by most swimmers. Persons who have noticed the salt have not objected to its presence and, in fact, has unexpectedly commented upon the ease of these waters upon their eyes and the absence of excess chlorine. The recommended salt concentrations are not as large as some might think because all health standards for drinking waters permit salt concentrations up to 500 ppm. Under some circumstances, acceptable drinking waters may have up to 1000 ppm of total salts. Moreover, with present practices of adding concentrated hypochlorites to pools, salt concentrations greater than 2000 ppm are often encountered in approved pools after a few weeks of use because hypochlorites revert to salt as they are used. Notice too, that the salt used in this invention needs only to be added once or twice a year for make-up purposes, whereas presently used hypochlorites need to be added almost every day and sometimes several times a day. Salt is quickly and conveniently added to pools by pouring common rock salt into the skimmer or other filter intakes with the electrolysis device temporarily turned off until all salt has dissolved. Salt concentration is preferably determined by chemical analysis using comparator kits made for the purpose. Ionic conductivity meters or professional chemical analysis of the pool, obviously, are more accurate methods for setting the chloride concentrations at about 3000 ppm.

Referring now to FIG. 2, operation of this invention is started by inserting electrolysis cell 20 into the exit filter line using any orientation for the cell which is convenient to the pool owner or builder, as there is no preferred front or back or side or up or down with the final assembled device. Of course, users will need to see and have easy access to regulator 14. Easy access to remove the electrode assembly 16, as illustrated in FIG. 2, is also desirable for cleaning or examination of the internal parts. Then, an appropriate size of cover 22 with attached electrode assembly 16 is inserted into the box and fastened down. Control box 21 is next pushed onto the appropriate solderless connections, and the ac line is plugged into the 120 or 240 rms volt supply near poolside, as appropriate. After some minutes of pumping filter water through the device, and after being assured of proper salt concentration, switch 12 is turned to position 13 for regulator 14 and control of half wave rectification. A sample of exit water is then taken into an ordinary ortho tolidine dye comparator, or its equivalent, in accordance with common practice for monitoring chlorine concentrations in pools. The pool owner then simply adjusts control 14 until his pool is being maintained in the proper range of 0.3 to 0.6 ppm of residual chlorine. For badly contaminated pools requiring superchlorination, switch 13 is placed in position 12 for full wave rectification and the temporary maximum output of the device is obtained. With this procedure for using this invention, an advantage is that the actual filter turnover rate, which usually varies daily with the condition of the filter surfaces, is not too important. Thus, with this control 14 adjusted as indicated, the desired chlorine levels are maintained in accordance with the initial setting of regulator 14 rather than by the pumping rate. After the initial concentration check, the pool operator merely adjusts regulator 14 up or down in accordance with his independent measurements or estimates of needs for remaining in the range of 0.3 to 0.6 ppm of residual chlorine. Chemical measurement of chloride concentrations about once a month is the preferred method for control of the pool. If too much salt is put into the pool, i.e., more than 3500 ppm of sodium chloride, the owner may either wait for normal splash makeup and rain to dilute the pool, or he may backwash through his filter and replace the water thereby removed with pure water.

As a continuation of this invention, it has been discovered how to make small dispensers of sodium hypochlorites and other oxyhalides. Hypochlorites are presently made commercially by reacting chlorine gas with sodium hydroxide solutions after these starting chemicals are prepared separately. Numerous patents, however, do exist on the preparation of hypochlorites by direct electrolysis of salt solutions and some of these processes have been commercialized in Europe, the U.S.A., and elsewhere. These state of the art cells have been less than 25 percent in their energy efficiency. Consequently, they require cooling coils and large power supplies that have made the direct electrolysis process noncompetative with chemical processes. One reason for these inefficiencies has been the undesirable precipitation of hard water impurities within the narrow gaps required for high current densities without excessive heat generation. Another reason for the inefficiencies has been electrical leakages around bipolar electrodes with moving liquids, as previously discussed. All of the previous cells suffer from the complications described in this specification with regard to transformers, large currents, grounding phenomena, the preferred way to make long lasting bipolar electrodes, and so forth.

U.S. Pat. No. 3,819,504, for example, teaches a need for preelectrolysis of the brines before they enter the narrow gaps between electrodes where the sodium hypochlorite is prepared. A recent Russian Pat. No. 390,016 (July 1973) teaches a need to have cathodic current densities in the range of 2 to 2.5 times the anodic current densities to achieve high current efficiency for the yield of hypochlorites. U.S. Pat. No. 3,779,889 describes an electrolytic cell somewhat similar to the present invention for manufacturing oxyhalogens but does not teach how to overcome the precipitations usually encountered with hard waters nor how to overcome some of the heat, large current, and inefficiency problems just mentioned. U.S. Pat. No. 3,790,464 teaches the use of rotatable bipolar electrodes to reduce the accumulation of solid products on the electrodes. Also, U.S. Pat. No. 3,766,045 teaches the use of parallel cathode plates which are elongated upward and downward longer than the anode plates to prevent the adherence of deposits in the desired reaction zone. A recent German Pat. No. 2,262,714 (June, 1973) teaches the use of a periodic reversal of the potential between electrodes to prevent lime deposition. All these prior inventions include the use of transformers for voltage control which, we have discovered, raises unnecessarily the expense and size of devices to a frequently prohibitive level.

An important part of the present discovery is that the presently cited Equations (1), (2), and (3) are specifically applicable for the design of simple and efficient cells to make hypochlorites and other oxyhalides, such as chlorates and perchlorates, at a cost substantially less than by any other cells heretofore described. The combination of (a) coated titanium electrodes with (b) stainless steel cathodes, and with (c) fluid velocities in excess of 3 feet per second is also necessary to avoid the accumulation of precipitates between electrodes from the use of sea or other hard waters. The earlier teachings about baffles, about edge protections via shielding strips or recessing of electrodes, and about separate grounding screens are also applicable to the making of hypochlorites and other oxyhalides, as described later under Examples IV and V. It is, of course, desirable to use pure water and pure salt so as to secure pure and colorless solutions, but minor amounts of hardness or impurities in a drinking grade of water can be used in the cells of this invention.

What distinguishes this invention from what is already known will be seen by reference to FIG. 5. A drinking water supply 50 at pressures between 20 and 40 psi is adequate for these devices which are made to operate at about 30 psi gage. Rock salt is added to the saturator 52 through the salt plug 59. Bypass 53 is made large enough to accommodate the water control tube 55 when sealed with gasket 54. While there is nothing unusual about the saturator 52 (they are easily adapted from a variety of brine tanks for commercial water softeners), the water control tube 55 in combination with the brine control tube 56 are critically important. These control tubes dilute the saturated brine to the desired levels and they are critical because (a) if the brine from 52 is not diluted enough, the conductance in electrolysis cell 58 may become excessive and too much unreacted salt end up in the exit to the storage bottles, whereas (b) if the brine from 52 is diluted too much, the conductance in electrolysis cell 58 may become too small and chlorate formation or oxygen evolution may occur, both of which detract from the desired hypochlorite and tend to attack the electrodes and to overheat the electrolyte. We have found it possible to control this critical dilution of saturated brines by selecting a ratio of diameters for water tube 55 to brine tube 56 such that the flow rates through them are approximately in the ratio of the dilution of saturated brine desired, with suitable allowances for differences of viscosities of the water versus the brine as well as the differences between specific gravities of the saturated versus the diluted brines.

Upon leaving the mixer 57, the diluted brine enters electrolysis cell 58 which is designed in accordance with Equations (1), (2), and (3) previously described. However, for these applications requiring more concentrated solutions than for swimming pools, it is necessary to distinguish $n_e$, the number of bipolar cells electrically in series in Equation (2), from $n_{hy}$, the number of parallel gaps in Equation (1) through which the solution to be electrolyzed must flow. To obtain suitable liquid velocities and electrode heights, it has been found almost necessary to let $n_{hy} = 1$ for making household bleach solutions. On the other hand, fluid velocities can be less than for the swimming pool application because of the relatively large quanties of hydrogen gas that accumulates as the solution is pushed through the cell. Because $n_{hy} = 1$, it is necessary to position the bipolar electrodes so that the liquid flow reverses direction $n_e$ times, i.e., for each bipolar cell. Otherwise, the bipolar electrodes are constructed as previously described for FIG. 4.

The constraints imposed by Equation (1), (2), and (3) plus the further constraints that (a) too high a current density leads to overheating and attack of the positive electrodes whereas (b) too low a current density leads to large cells with prohibitively high costs, are all important discoveries not heretofore recognized in the art of making hypochlorites by direct electrolysis. Therefore, prior to this invention, household bleach solutions are made predominantly by chemical reactions in the United States, and elsewhere, rather than by the more direct route of electrolysis.

In very large applications, such as water and sewage treatment plants that involve tens or hundreds of millions of gallons per day, the direct electrolysis route has received more successful attentions. Large commercial hypochlorite cells are offered for sale by the Pacific Engineering and Production Company in Hendersen, Nev., by the Diamond-Shamrock Corporations in Painesville, Ohio, by Ionics, Incorporated, in Cambridge Massachusetts, by A. Johnson and Co., Ltd. In London, England, and by others. Much of the patent literature already cited, and more, pertains to hypochlorite production for the treatments of municipal waters. All these cells and their installations typically operate at about 25 percent energy efficiency and have an initial cost which is two to three times as much as large commercial chlorine plants utilizing diaphragm or mercury cells. Consequently, there has existed to the present time substantial economic incentives for municipalities to install facilities for utilizing chlorine gas in preference to making hypochlorites on site. Another incentive for the use of chlorine over hypochlorites is that sodium hypochlorites add to the sodium contents of the drinking waters or sewage effluents, both as inerts and as the ultimate reduction product of the hypochlorite whereas gaseous chlorine does not add to the sodium levels. As waters tend to be recycled more and more, or to be reused by several municipalities on a given river or water source, these higher sodium levels are becoming a problem. Present hypochlorite cells require more than 3.3 pounds of salt to manufacture one pound of sodium hypochlorite. Therefore, an object of the cells of this invention is to achieve higher conversion efficiency so that substantially less than 3.3 pounds of salt is required to prepare one pound of the hypochlorite.

On the other hand, chlorine installations are dangerous to handle (a) because chlorine is poisonous, gas masks must be at hand for skilled persons to use them, and (b) because overdoses are frequently encountered which lead to fish-kills or obnoxious tastes in the water. Both these common hazzards will be essentially nonexistent with the use of hypochlorite preparations at each site as needed. Storage tanks of hypochlorite, however, do also present the accidental overdose hazards.

The design of hypochlorite systems for the treatment of municipal water differ from the swimming pool application at least two ways: (a) the waters are not recirculated as in the swimming pools and (b) the total salt added to the municipal waters should not exceed a few parts per million whereas the salt in the swimming pools can be used comfortably at a few thousand parts per million of salt. The treatment of municipal waters is like the swimming pool problem (and unlike the above dispenser problem) in that hypochlorite demands are extremely variable. Thus drinking waters will normally want additions of 0.2 to 2 ppm of active chlorine, but some circumstances each year require capabilities to add up to 10 ppm of active chlorine. Likewise, sewage treatment plants normally will want 3 to 4 ppm of active chlorine but capabilities to add up to 10 ppm are sometimes required by health authorities and environmental protection agencies. Moreover, unlike both the swimming pool and the dispenser problems, the water flows vary with the time of day by a factor of two or more. These extremely wide ranges of circumstances tend to make a hypochlorite plant on site to be very expensive because it is expected to handle emergency conditions which arise only a small part of the time. This means an expensive installation is not used most of the time. Accordingly, another object of this invention is to provide capabilities for emergency conditions with a minimum of capital investment and labor.

FIGS. 6 and 7 show the essential features of the new system which take advantage of the improvements previously described in connection with FIGS. 1, 2, 3, 4, and 5. In FIG. 6, the large water source 60 is measured in millions of gallons per day. Strainer 61 is to assure that no large solids enter the pumping stream. The constant volume pump 62 is a positive displacement type of pump whose volume output is relatively independent of the pressure but whose volume is directly proportional to the RPM of the pump motor. Such pumps are commercially available in a wide range of sizes as, roller, gear, or rotary screw pumps. The latter are preferred where suspended solids may exist in the stream coming through strainer 61. The output of pump 62 is split so that the saturated brine from tank 66 is diluted to about 2.5 weight percent NaCl in mixer 67. The dilution process is partially controlled in this system by suitable selection of the pipes 63 and 64 as already explained for FIG. 5. However, because of the extreme variable demands upon the system in FIGS. 6 and 7, valve 65 is also needed for additional control of the brine concentrations.

The volume of liquids coming out of mixer 67 must be fast enough to maintain an effective liquid velocity in excess of 3 feet per second in going through cells 68. Then, sediments in the cells are avoided so that the usual requirements for heat exchangers in such systems can be done away with.

When many cells are placed hydraulically in series, as indicated by cells 74 and 75 in FIG. 7, it is desirable to have hydrogen gas escape valves, 72. I have found that one hydrogen escape valve 72 for about each pound of sodium hypochlorite produced within a group of closed cells is adequate. Such valves have simple float mechanisms such that when there is no gas under the valve, it is closed but when gas appears under the float mechanism, the valve opens. Sometimes small amounts of liquid also escape with the gases but for these large installations, these small losses can be neglected.

In FIG. 7, rectifiers 15 and switches 73 are designed to permit full wave rectification for emergency chlorinations of 10 ppm but to use halfwave rectifications for normal operations of 5 ppm or less. This electrical arrangement provides cathodic protection to all metal parts in the system during normal operations and both improves efficiency and prolongs the life of the electrodes as previously explained in connection with the swimming pool device. Likewise the previously described baffle extensions, the grounding screens, and the shielding of electrode edges are all vital parts of this embodiment of this invention. Fine adjustments of chlorine levels below 5 ppm are made by turning off electrical switches 73 while water continues to run through those cells.

The separate rectifier bridges 15 for each module are preferred over a single recifier power source for both economic and thermal reasons. Thus, small rectifiers up to 30 amperes at 1000 volts peak inverse voltage usually cost only about 10 percent of the cost of rectifiers for larger currents because of their simple cooling situation as well as because of apparent mass production economics for the smaller rectifiers. The main points in the invention are to retain consistancy with Equations (1), (2), and (3) using stainless steel cathodes with coated titanium anodes and with the preferred bipolar connections already described.

This invention is illustrated, but not limited by the following examples.

EXAMPLE I

A device was made to have 9 bipolar cells in which all electrode faces were exposed 3.3-inches high and about 0.825 inch deep in the axis of water flow. The extreme positive electrode was a piece of platinum coated electrode, Type MA, from Maraston Excelsior Limited. It was four inches high, 0.035 inch thick, and protruded through the cell cover for electrical connection to the positive terminal of the rectifier. The extreme negative electrode was also 4 inches high but only 0.010 inch thick iron can stock and it protruded through the cover for electrical connection to the negative terminal of the rectifier. The intermediate bipolar positive electrodes were made of 22-mill thick titanium with proprietary coatings prepared by the Electrode Corporation of Chardon, Ohio and labeled 5000 A, B, or C. The intermediate negatives were made of 10-mil iron can stock. In between each bipolar positive titanium and negative iron surface there was placed a translucent, stiff, acrylic type of plastic baffle. Each baffle was exactly the same height, 3.5 inches, as the positive titanium electrode against it. The negative electrode material was made long enough to reach over and under each baffle plus up from the bottom and down from the top about 0.1 inch. Thereby each negative face was physically separated from each positive face by the baffle yet it made electrical contact at each end of the positive. Each baffle was 0.5 inch wider than the electrodes, namely 1.325 inch, and was made to extend one-quarter inch in both directions beyond the electrode in the axis of water flow. All these bipolar electrode assemblies were fitted snugly into dimensioned slots at the top and bottom of the electrode assembly to provide gaps of about 60 mils between the facing positives and negatives. Common wooden toothpicks were inserted in each gap to help hold electrode faces apart wherever they seemed to be closest together by spring action. The slotted ends were then filled and sealed from contact with the water using an acrylic cement plus a bathtub type of sealant at the ends of the slots.

This device was operated with half wave rectification through the use of a single diode having a 6.0 ampere, 200 peak inverse voltage rating. An electrically grounded galvanized iron "gravel" screen was placed at the entrance and exit ends of the device. In the ungrounded ac line a 600 watt conventional full-range electronic light dimmer sold by W. W. Grainger, Inc. of Columbus, Ohio under Stock No. 4X003 was inserted. All filter water was made to flow through the electrode assembly.

This cell was operated intermittently over a period of 34 days, most of which were in excess of 90° F during the day time. There was no observable corrosion of the iron grounding screens during 613 hours of electrolysis at an average of 1.4 amperes. Chlorine concentrations up to about 6 ppm of chlorine were observed to come out of the exit filter line with a measured turnover rate of 9.4 hours on a 13,600 gallon pool which contained about 0.21 weight percent sodium chloride. When the device was turned off for two days, algae began to appear on the pool bottom but these were killed by turning on the electrolysis cell for a few hours. Many persons used the pool and commented on the clarity of the water and its ease upon their eyes and the absence of any odors. A few persons noted a faint taste of salt but said it was unobjectionable. There were no evidences of electrical shock and measurements of the voltage of an inert probe in the exit stream of water versus the metal side of the pool showed the existance of less than one volt, i.e., essentially zero. Some trouble was had with water leaks at the bipolar joints in the slots which led to unwanted corrosion in those areas. Some edge attack was observed on the extreme positive electrode and on the first 3 or 4 negative electrode edges towards the positive electrode side. Otherwise, this cell operated satisfactorily without plugging, and under the control of children as well as adults thereby attesting to its simplicity and safety.

EXAMPLE II

A cubical cell was made of ¼ inch thick acrylic plastic with the entrance and exit ends being about 4.3 inches tall by 3.8 inches wide and of double thickness. Two inch I.D. polyvinylchloride female fittings were sealed in these ends. The sides of the box were also 4.3 inches tall and 4.2 inches from entrance to exit. The electrode holder contained 14 bipolar cells whose electrodes had an exposed height of 3.3 inches and a depth of 1.4 inches. All the positive electrode faces in this cell were furnished by the Marston Excelsior Limited Company of Wolverhampton, England. These positive electrodes were all about 35 mils thick. There were three kinds of coatings designated as "100 microinch," "20 gram," and "10 gram," and all three kinds were used in this cell and in the following order from the most positive electrode toward the last positive opposite the entrance negative electrode: electrodes 1, 2, 3, 4, and 5 = "100 microinch," electrodes 6, 7, 14, and 15 = "10 gram," and electrodes 8, 9, 10, 11, 12, and 13 = "20 gram." Common iron sheet about 15 mils thick was used for all of the negative electrodes. They were also 1.4 inches wide with 3.3 inches of exposed height but with enough extra length to fold over the baffles and to cover about 0.1 inch of the positive electrodes at both top and bottom for electrical connections between bipolar cells. The extreme positive and negative electrodes had additional length to protrude through the cover for connection to the rectifier bridge. The 14 baffles in this cell were made of acrylic sheet 77 mils thick and cut to a size of 3.5 inches tall and 2.0 inches deep. The electrode holder sides, bottom, and top were also 2.0 inches deep and made of 0.25 inch thick acrylic. The gaps between electrodes were made to be about 63 mils which gave a total cross sectional area for the gaps about equal to the cross sectional area of 2.0 inch I.D. piping plus 10 percent. After assembly of the bipolar electrodes, a thick vinyl cement was beaded across the slots at the top and bottom to seal off the slots from liquid flow.

Grounding screens, made of 40 mil iron wires having 0.25 inch square holes, were inserted at both the entrance and exit and were held by spacers provided in the electrolysis cell. One strand of each screen was fed through the cover for grounding connections.

The electrical control box on top of the sealed electrolysis cell contained an ordinary 15 ampere, unfiltered, rectifier bridge, manufactured by Westinghouse Corporation as type "W-H." Only one-quarter of this bridge was used so as to have only half-wave rectification. In the "hot" side of an 120 rms volt energy source was placed a conventional 600 watt light dimmer manufactured by the Leviton Company and sold under catalog No. 6600 BP. A single pole, double throw switch was inserted in the "hot" line to permit electrolysis current to go through the light dimmer for fine regulation up to 4 ppm of chlorine and to permit going around the light dimmer for emergency super chlorination at 8 ppm of chlorine in a 100 gallon per minute filter line. This electrical control box was about 4.2 inches by 3.8 inches in area to fit over the electrolysis cell and it was about 1.75 inches high to contain all the electrical connections, including grounding in the 3-wire electrical circuit. A metal stop was placed on the cover to limit the turning of the continuous adjustment knob on the light dimmer at a value equivalent to making about 4 ppm of chlorine. For twice this chlorine production the electrical switch mentioned above was used to bypass the time proportioning regulator.

This entire device was inserted directly into a 2.0 inch I.D. polyvinyl chloride pipe so that all water circulating from a 35,000 gallon pool through the filter also passed through this unit. Water in the swimming pool was analyzed for chlorides before this device was turned on. The water was found to have a chloride concentration equivalent to 0.131 weight percent which is about 1310 ppm or about 390 lbs of sodium chloride in this 35,000 gallon pool. An additional 240 pounds of rock salt was added to bring the salt concentration up to about 2000 ppm.

When current was turned on and adjustments were made with the regulators and switches, the average dc or ac current was found to vary linearly with average dc or rms ac voltages. The intercept of average dc volts at zero current was 2.1 volts per cell. However, the maximum obtainable current was about 5.6 ac amperes into the rectifier at an average 107 dc volts measured output from the rectifier. This power level was only about 60 percent of the maximum current for which the cell was designed. Even so, more than 4 ppm of chlorine were produced in the filter exit line. An originally cloudy pool quickly became clear. Positive tests for residual chlorine in excess of 1 ppm were measured after about 10 hours of electrolysis. Current was then turned down with the light dimmer control to about 1.0 ampere. Very tiny hydrogen bubbles emerged from six filter line exits as visual evidence of the electrolysis cell operating about 50 feet away from the pool. Thereafter, this device maintained the pool in a clean and sanitary condition for 60 days. Upon dismantling the cell, all three kinds of coatings under test appeared to be satisfactory. There was mild edge corrosion and pitting of the first five positive electrodes, counting from the extreme positive towards the extreme negative side. Leaking water through the slots had allowed corrosion of some of the bipolar connections and, therefore, maximum currents, at 120 rms volt input, were approximately cut in half. Owners of this pool expressed pleasure with the simplicity and convenience of this device.

EXAMPLE III

Using the results learned from Example I and II plus about 15 other examples with both successful and unsuccessful modifications, a family of devices were designed for home swimming pools with standard sizes of 10-, 15-, 20-, 30-, and 40-thousand gallons. For all these devices, the following parameters were the same: Turnover rate = 10 hours; maximum ppm $Cl_2$ = 5; maximum average current denisty = 1.0 ampere per square inch; number of bipolar cells = 9; gap width = 120 mils; electrode width = 1.70 inches (10% excess exposed electrode area); Baffle thickness = 187 mils (3/16 inch); Baffle width = 4.2 inches; Electrolysis cell width = 3.5 inches, length = 3.2 inches; and primary power source = 120 rms volts ac. All the anodes were coated titanium sheets, 20 mils thick, from the Electrode Corporation of Chardon, Ohio, Type BX. All the cathodes were 15 mil thick stainless steel sheet prepared as described for FIG. 4 of the Specifications. Then, other variables were fixed according to pool size as follows:

| Pool size thousands of gallons | I.D. of Inlet piping, inches | Design gallons per minute | Cut height of baffles and positives inches | Design average dc amperes | Outside height of electrolysis box, inches |
|---|---|---|---|---|---|
| 10 | 1.00 | 16.7 | 1.3 | 1.8 | 2.5 |
| 15 | 1.25 | 25.0 | 1.8 | 2.7 | 3.0 |
| 20 | 1.50 | 33.3 | 2.3 | 3.6 | 3.5 |
| 30 | 2.00 | 50.0 | 3.3 | 5.4 | 4.5 |
| 40 | 2.00 | 66.7 | 4.4 | 7.1 | 5.6 |

All these devices use the same 10 ampere size rectifier bridge for simplicity of assembly and all use the same dimmer control as just described in Examples I and II. The grounding screens are inserted in the entrance and exit lines about 12 inches beyond the electrolysis cell. These grounding screens were 60-mil thick titanium screens manufactured by the Electrode Corporation and were coated on both sides with a proprietary coating labeled "BX Titanium Anode Mesh." They were made about ⅔ of the I.D. of the entrance and exit piping in column 2 above but held in place with a little cemented holder at the bottom of the tubing plus a single strand of the mesh protruding out the top of the tubing for direct electrical connection to the grounded wiring.

When the 20,000-gallon size was put on special test with 0.3 weight percent salt in the pool water, Equation (2) of the Specifications was found to yield an experimental resistivity, R, which was slightly less than the anticipated 80 ohm-inches but the intercept of 2.1 volts at zero current was observed, as in previous examples. Thus, 3.6 amperes were designed in Column 5 of the above tabulation but actual maximum dc current was 4.0 amperes. Chemical analysis for chlorine indicated an electrochemical efficiency, in this instance, of about 70 percent of theoretical.

EXAMPLE IV

In response to a request to make a practical device to dispense 1.0 weight per cent sodium hypochlorite for household bleach purposes, a device was designed which started with a reservoir of saturated salt solution because saturated salt solutions are relatively temperature independent and about the only concentration that can be prepared reliably by a wide variety of persons in a wide variety of circumstances. Such saturated solutions are about 26.5 weight percent in NaCl. A pressurized 40-gallon brine storage tank of the kind normally used for water softeners, W. W. Grainger Catalog number 3E045, was connected directly to a municipal water line with a ¼-inch I.D. pipe. Coming out of this brine tank at about 3-inches from the bottom was a 6-inch length of number-11 gage PVC tubing whose I.D. was 0.095-inch and cross sectional area 0.00713 square inch. This small length of number-11 tubing was sealed into a small plastic container for mixing with water coming in by way of a second PVC tube of number-2 gage whose I.D. was 0.263-inch and cross sectional area 0.0542 square inch. The sum of these two cross sectional areas was approximately equal to the gap areas in an electrolysis cell for making 0.8 gallon per minute of 1-weight percent NaOCl. These critical control tubes were purchased from Hughes-Peter, Inc., under the title "Alpha Polyvinlychloride PVC-105" and were sealed into a PVC plastic box using PVC materials and cements sold by the United States Plastic Corp. under stock numbers 45019 and 45044, respectively. By trial and error at about 30 psi in the water supply, it was found that the ratio of outputs from water control tube 55 to brine control tube 56, in FIG. 5, was in the ratio of 0.736/0.0642 at 20° C and that their combined output, when fastened into cell 58, was 0.80 gallon per minute when tube 55 was 5.9 inches long of the number 2-gage and tube 56 was 6.0 inches long of the number 11-gage. The diluted brine then analyzed to be 2.5 weight percent, or 25,000 ppm in NaCl.

The electrolysis cell 58 used ¼-inch thick acrylic sheet for its six sides. Its outside dimensions were 1.73 inches high by 10.5 inches wide by 10.1 inches deep in the direction of water flow. The electrodes were cut 1.25 inches high by 8.3 inches long and were made as described in connection with FIG. 4 and Example III. Their exposed area in each cell was about 8.6 square inches being about 1.05 inch high by 8.3 inches long. The positives were supplied from the Electrode Corporation, Chardon, Ohio, and the negatives were 15-mil thick stainless steel sheeting from a junkyard.

The baffles were ⅛-inch thick acrylic sheets 1.23 inches high by 9.5 inches long, thereby extending beyond each electrode 0.6 inch. They were routed to protect the electrode edges as previously described. These inside baffles were alternately staggered with a ⅛-inch opening at every other opposite end so that the electrolyte flowed in a continuous path from entrance to exit past a total of fifty-two bipolar cells. The extreme end electrodes each had duplicate external connections as depicted in FIGS. 2 and 3(a) except that the first and last gaps had no electrodes in them. This absence of electrodes in the first and last gap areas provided the long separation required to effectively isolate the grounding screens 18 and people and equipment from the extreme electrodes inside the cell, as discussed in the specification. The entire cell was cemented together and strapped and tested for absence of leaks at 60 psi before use.

When this cell was operated with 208 volts dc applied to it, the amperage was 26 at about 3.0 amperes per square inch; the exit temperature stabilized at about 37° C when the entrance temperature was about 20° C. The effluent was 1.0 weight percent in active chlorine, as NaOCl, plus 1.7 weight percent in unreacted sodium chloride. Hydrogen gas measured about 1000 cubic inches per minute at 20 psi. The energy efficiency was about 42% based on a decomposition potential of 2.1 volts per cell. This efficiency is nearly double the 22% efficiency calculated in a similar way on data reported by W. A. Koehler in "Principles and Applications of Electrochemistry" Volume II, pages 268–271, for two kinds of cell making sodium hypochlorite solutions by electrolysis, as follows:

| Cell | WH/lb | % Efficiency | W/o NaOCl |
|---|---|---|---|
| This invention | 1620 | 42.4 | 1.0 |
| Electrochemical Co. | 3100 | 22.2 | 0.7 |
| Kellner | 2800 | 24.5 | 2.5 |
| Kellner | 9300 | 7.4 | 9.0 |

EXAMPLE V

In response to a request to demonstrate how the cell of this invention could be used for a sewage treatment plant for the City of Columbus, Ohio, a prototype battery of cells was designed as follows.

A number of sewage treatment lines were combined just before discharge into the Scioto River with a design maximum flow of 120 MGD. Suspended solids had already been reduced to 8 ppm at this point in the system and it was desired to install a capability to add up to 10 ppm of sodium hypochlorite from the electrolytic cells of this invention. Accordingly, a 5 HP motor, splash-proof, 3-phase, 1800 rpm, 460 volt, 60 Hz, Stock No. 3N219, from W. W. Grainger, Inc., was belted to a bronze rotary gear pump with carbon bearings, Stock No. 1P781, so as to operate at about 6000 rpm. The flow rate was then about a constant 84 gallons per minute at pressures between 20 and 60 psi with 2.5-inch I.D. plastic piping. This 2.5-inch piping was next split with a ⅜-inch pipe going into a brine saturating tank and a 2-inch line going into a mixer. Coming out of the saturating tank in another ⅜-inch I.D. pipe was a simple valve which was adjusted until the flow rate out of the saturator with 265,000 ppm of salt was 8.4 gallons per minute. Then, coming out of the mixer was 84 gallons per minute containing 26,500 ppm of NaCl which was fed into the electrolysis cells of this invention as follows:

Cells 3.0 inches high by 12 inches long by 8 inches wide were connected into modules of five cells each with 12 inches between each cell. Each module was thus about 3 inches high by 8 inches wide by 10 feet long and weighed empty about 50 pounds. With three close-off valves and a bypass for each module, one man could easily disconnect and remove or replace a defective module. Each module had its own 30 ampere, 1000 peak inverse volts rectifier bridge Stock No. s6458-10 from Hughes-Peters, Inc. Each module also had a 30 ampere, 600 volt, single pole, three position, detent switch, series 24 from the Electro Switch Corp., for the purpose of allowing "on-full wave," "off," or "on-half wave" for each module.

Inside each cell, 20 electrodes and baffles were 2.25 inches high with 2.0 inches exposed to the moving electrolyte. The electrodes were 5.5 inches long and the baffles were 8.0 inches long and they were put together as described in connection with FIG. 4. Before and after the baffles, a one-inch space was allowed for uniform ingress and egress of the liquids.

The cell bodies were made of ¼-inch PVC sheeting with 2-inch plumbing in and out as illustrated for the swimming pool device in FIG. 2. Fifty-five (55) modules of 5 cells each placed in series to give a final output of 84 gallons per minute of liquids containing 10,000 ppm of NaOCl and 18,000 ppm of unreacted salt which, when fed back into the 120 MGD (=84,000 gallons per minute) sewer line, yielded the maximum 10 ppm of active chlorine as NaOCl.

By switching all cells to half-wave operation, the maximum hypochlorite was reduced to 5 ppm. Then, the valve out of the saturator was reduced to yield about 20,000 ppm of salt out of the mixer so that unreacted salt into the sewer effluent was reduced to 16 ppm. Thereafter, for even further reductions in hypochlorite, the salt content coming out of the saturator was adjusted proportionately to the desired ppm of NaOCl in the final sewer line, as follows:

| ppm $Cl_2$ into Sewer line | thousands of ppm NaCl out of mixer into cells | Extra ppm NaCl added to line | kwhr per lb NaOCl |
|---|---|---|---|
| 10 | 26 | 18 | 2.8 |
| 5 | 20 | 16 | 2.8 |
| 4 | 16 | 13 | 2.9 |
| 3 | 12 | 10 | 3.0 |
| 2 | 8 | 6 | 3.2 |

Fine control of hypochlorite concentration to better than ± 0.1 ppm was possible with this system by combining the above salt concentrations with the turning "off" of certain cells while liquids continued to flow through them. All of the above kwhr per lb NaOCl at about 2.3 amperes per square inch are less than has been heretofore possible with known electrolysis cells for making hypochlorite at even smaller current densities.

Having thus described my invention, I claim:

1. Apparatus for electrolyzing a dilute aqueous brine solution flowing therethrough comprising:
   a. a full-wave bridge rectifier adapted to be electrically connected directly to a source of alternating current;
   b. an electrode assembly connected across said rectifier comprising a negative electrode, a positive electrode, and one or more bipolar electrodes;
   c. a cell enclosure adapted to receive and support said electrode assembly and further adapted to the flow of said dilute aqueous brine solution therethrough; and
   d. grounding means surrounding said electrode assembly; the number, $n$, of bipolar electrodes, the height, $h$, of the electrodes, and their spacing, gap, being determined by the equations:

I. $n \times gap \times h = k \times$ gallons/minute;

II. av. dc. volts = $2.1 \times n + n \times gap \times R \times \overline{CD}$;

where:

$n$ = number of bipolar electrodes + 1;

gap = distance in inches between opposing faces of adjacent electrodes;

$h$ = the height in inches of the electrode surfaces exposed to contact with said brine solution;

gallons/minute = total flow through said apparatus and through said electrode assembly in gallons per minute of said aqueous brine solution;

av. d.c volts = root mean square voltage $\times$ 0.0637/0.707;

R = resistivity of said aqueous brine solution in ohm-inches;
$\overline{CD}$ = average maximum current density in amperes per square inch; and
k = about 0.038 to about 0.077.

2. The apparatus of claim 1 wherein k = about 0.064.

3. The apparatus of claim 1 and a time-proportioning regulator electrically interconnected between said full-wave bridge rectifier and said alternating current source.

4. The apparatus of claim 3 and switching means for alternatively connecting said alternating current source either directly to said time proportioning regulator or directly to said full-wave bridge rectifier.

5. The apparatus of claim 4 wherein said one or more bipolar electrodes are recessed in rigid non-conductive flat shield plates extending parallel to the flow path of said aqueous brine solution and for a distance on either side of each of said electrodes equal to at least 10 times the distance between opposing faces of adjacent electrodes.

6. The apparatus of claim 4 wherein said two terminal electrodes are recessed in rigid non-conductive flat shield plates extending parallel to the flow path of said aqueous brine solution and for a distance on either side of each of said terminal electrodes equal to at least 10 times the distance between opposing faces of adjacent electrodes.

7. The apparatus of claim 1 and a half-wave diode electrically connected in series with said time-proportioning regulator.

8. The apparatus of claim 7 wherein said one or more bipolar electrodes are recessed in rigid non-conductive flat shield plates extending parallel to the flow path of said aqueous brine solution and for a distance on either side of each of said electrodes equal to at least 10 times the distance between opposing faces of adjacent electrodes.

9. The apparatus of claim 1 including a half-wave diode and means for alternatively connecting said alternating current source either directly to said half-wave diode or directly to said full-wave bridge rectifier.

10. The apparatus of claim 1 wherein said grounding means are spaced at a distance from the electrodes equal to about 100 times the distance between opposing faces of adjacent electrodes.

* * * * *